July 7, 1964     R. R. BORNGRAEBER     3,140,046
VARIABLE DRIVE MECHANISM
Filed July 2, 1962
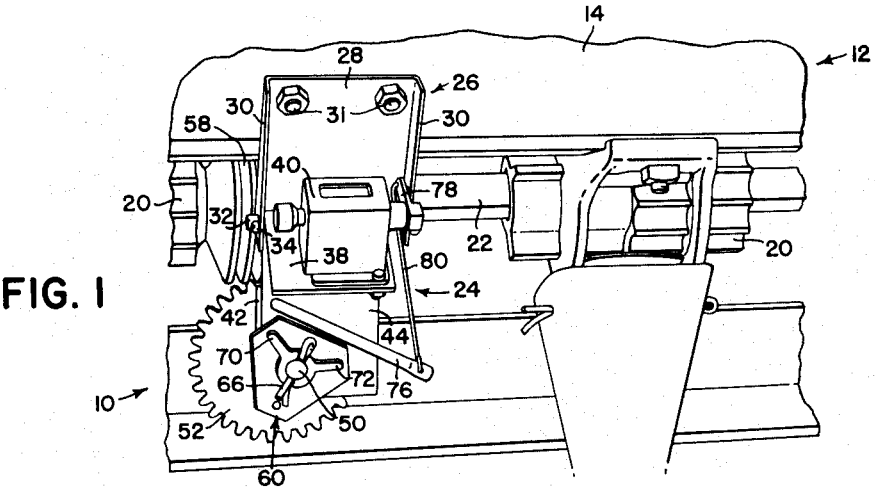
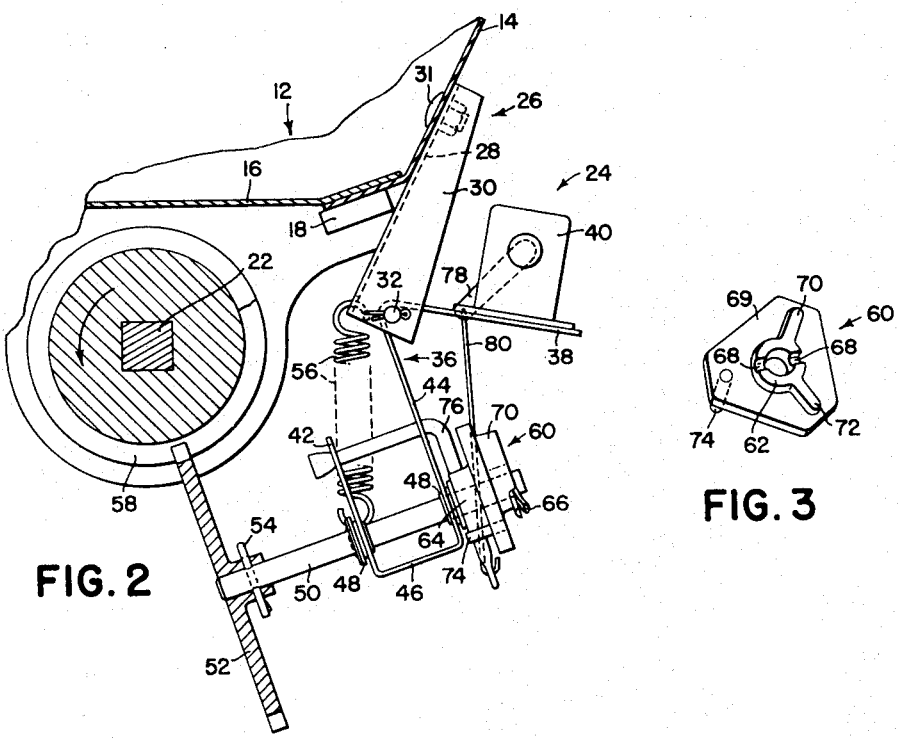
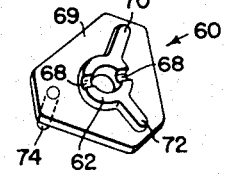
INVENTOR.
ROYCE R. BORNGRAEBER
BY
AGENT United States Patent Office 3,140,046
Patented July 7, 1964

3,140,046
VARIABLE DRIVE MECHANISM
Royce R. Borngraeber, Horicon, Wis., assignor to Deere & Company, Moline, Ill., a corporation of Delaware
Filed July 2, 1962, Ser. No. 206,830
7 Claims. (Cl. 235—91)

The present invention relates generally to agricultural implements and more particularly to planting implements, such as grain drills or the like.

The object and general nature of the present invention is the provision of a new and improved land measuring device or acre meter particularly adapted to farm implements, such as grain drills or the like, in which an indication is given of the number of acres traversed by the implement. For instance, it is especially desirable when drilling wheat or other seed to know if the correct amount of seed is being drilled, and to this end an accurate check of acreage covered must be kept. The land measurer of the present invention automatically records the acres covered under varying circumstances and makes it possible to check the amount of seed being drilled at any time.

Another object of this invention is to provide an acre meter responsive to the revolutions of the feed shaft in a grain drill, in which the total number of revolutions of the feed shaft per acre covered may vary.

It is a principal feature of this invention to provide an acre meter employing a trip counter to register the acres covered, and variable drive means interconnecting the feed shaft of a drill and the trip counter. To this end, in applicant's preferred embodiment, a drive gear is mounted on a drive shaft and engages a worm mounted on the feed shaft, the drive gear in turn causing the trip counter to be tripped through a tripping gear or wheel which is also mounted on the drive shaft. The design of applicant's acre meter is such that the number of teeth in the drive gear that engages the worm on the feed shaft is normally equal to the number of feed shaft revolutions per acre divided by the number of trips necessary to have the trip counter indicate coverage of one acre, which is ten in applicant's preferred embodiment. For example, if the feed shaft rotates 500 times during the drilling of one acre, 50 teeth will be employed in the drive gear for a counter which requires 10 trips per acre, and the drive gear shaft will be rotated ten times, which will in turn cause the trip counter to be actuated ten times or once for each revolution by a tripping gear or wheel to be hereinafter described. Similarly, if the feed shaft rotates 180 times for one acre a gear of 18 teeth will be employed causing the trip counter to be actuated ten times. Thus it could be stated as a general rule that in applicant's preferred embodiment the number of teeth is preferably equal to one-tenth the number of revolutions of the feed shaft per acre. There is, however, a limit as to how few teeth may be employed because the root diameter of the drive gear must clear the head of the cotter pin used to hold the drive gear on its shaft. Also, on too small a gear, the teeth stand at such an angle that they cause binding on the worm. When the normal requirement is for a gear smaller than the established minimum of 17 in the preferred embodiment, applicant employs a larger drive gear which turns fewer revolutions in an acre and thus requires either two or three trips to obtain the desired result depending upon the disposition of applicant's tripping gear. For example, if the feed shaft rotates 100 times during the drilling of one acre applicant may employ a drive gear having either 20 teeth or 30 teeth. If a drive gear having 20 teeth is employed the drive shaft will be rotated 5 times in one acre. Since the counter employed must be tripped 10 times for every acre covered, applicant's tripping gear is so positioned that the counter is tripped two times for every revolution. Similarly, if applicant employs a drive gear having 30 teeth (for a feed shaft rate of 100 turns per acre) the tripping gear is so positioned that the counter will be tripped three times for every revolution of the drive gear shaft.

Another object of this invention is to provide a land measurer that may be driven from the feed shaft of either a grain drill having a conventional double run feed, or on grain drills of varying widths. For example, with respect to the latter type of grain drills, in one series produced by the assignee of this invention the drilling widths may vary from 4 ft. to 14 ft. in varying increments. In this series of grain drills an adjustable-gate fluted force feed is employed, and therefore, the total number of revolutions of the feed shaft per acre drilled in this type of drill will depend solely upon the width of the drill. Assuming that on a 4 ft. drill the feed shaft would revolve 210 times during the drilling of one acre, and that a counter is employed which is to be tripped 10 times during the coverage of each acre, then a gear having 21 teeth would be employed and the counter would be tripped 10 times, once for each revolution. On a 7 ft. grain drill the feed shaft would revolve only 120 times, since a gear having 12 teeth would be unsatisfactory in that it would have too few teeth, one having 24 teeth would be employed. Then during the drilling of one acre the gear shaft would be rotated only 5 times and by properly positioning applicant's trip wheel the counter would be tripped 2 times for each revolution or 10 times for every acre. In a drill 14 ft. in width where the feed shaft would rotate only 60 times, a gear having 18 teeth will be employed and the counter will be tripped 3 times for every revolution of the gear shaft, or 10 times per acre covered.

A still further object of this invention is to provide a land measurer of sturdy construction and of low manufacturing cost.

These and other objects and advantages of the present invention will be apparent to those skilled in the art after a consideration of the following detailed description, taken in conjunction with the accompanying drawings in which the preferred form of the present invention has been illustrated.

In the drawings:

FIG. 1 is a front view of a portion of a grain drill in which the land measurer of the present invention has been incorporated.

FIG. 2 is a generally vertical section taken through the land measurer and grain drill illustrated in FIG. 1.

FIG. 3 is a detailed perspective view of applicant's tripping gear.

Referring now to the drawings, particularly FIGS. 1 and 2, the reference numeral 10 indicates a grain drill which includes a hopper or seed box 12 having side walls 14 and a bottom wall 16 suitably connected together by means that also secures a reenforcing strap 18 to the sheets 14 and 16. Disposed along the bottom sheet or wall 16 is a plurality of seed dispensing units 20 driven by a seeding or feed shaft 22 which is driven in any suitable manner. The seeding units 20 as illustrated are of the adjustable-gate fluted force feed type and largely conventional, so far as the present invention is concerned. However, it is to be understood that applicant's invention is also suitable for use on grain drills which employ conventional double run feeds. It will be sufficient at this point to note that the seeding shaft 22 is driven during drilling proportionately to the rate of travel of the grain drill 10 and therefore a device which is responsive to the number of rotations of the seeding shaft 22 may be used as means for indicating the total acreage covered by the machine.

The land measurer device or acre meter, with which the present invention is more particularly concerned, is indicated in its entirety by the reference numeral 24. The device 24 includes a mounting bracket 26 formed with a back wall 28 and side walls 30. The bracket 26 is fixedly secured to the side wall 14 of the hopper 12 by fasteners 31. Extending through apertures in the lower portion of the side walls 30 is a mounting pin 32 which is held within the walls 30 by a cotter pin 34. Rigidly secured to the mounting pin 32 as by welding is a carrying bracket 36. The carrying bracket has a forwardly extending portion 38 upon which is mounted a trip counter of conventional construction. The carrying bracket 36 also has a downwardly extending U-shaped portion having front and rear legs 44 and 42 respectively and a bight portion 46 (FIG. 2). Disposed in apertures in the legs 42 and 44 are bearings 48 which rotatably carry a drive gear shaft 50.

Mounted upon the rearward end of the drive gear shaft 50 is the drive gear 52 which is held in place by a cotter pin 54. A spring 56 is secured at one end to the mounting bracket 26 and at the other end to the rear leg 42 and biases the drive gear 52 into engagement with a screw worm 58, which is secured about the seeding shaft 22.

A tripping gear or wheel 60 is disposed upon the front portion of the drive gear shaft 50 and includes first and second hub portions 62 and 64 respectively. The tripping gear 60 is nonrotatably held to the drive gear shaft by means of a cotter pin 66 which passes through an aperture (not illustrated) on one end of the drive gear shaft 50 and also through grooves 68 formed on the hub portions 62 and 64. On one side of the centrally disposed radially extending portion 69 of the tripping gear 60 are provided abutting surfaces 70, 72 which project radially outwardly from the hub portion 62 (FIG. 3). These abutments are spaced 120° apart. Spaced 120° from the abutments 70, 72 is another abutting surface in the form of a roll pin 74 which may be projected from either side of the radially extending portion 69.

A tripping lever 76 is rotatably disposed in the legs 42, 44, and has a portion which is adapted to be engaged by either the roll pin 74 or the lugs 70, 72, or both. Interconnecting the tripping lever 76 with an arm 78 on the counter 40 is a link 80.

In operation in a device which employs a trip counter that is tripped 10 times during the coverage of one acre, if the feed shaft is revolving at a rate of 300 revolutions per acre, a drive gear 52 having 30 teeth is employed which causes the drive gear shaft to be rotated 10 times during the drilling of one acre. The number of teeth (N) on the drive gear is selected in accordance with the following formula: $a/b \times n$ and not less than the established minimum of teeth, where $a$ is the total number of revolutions of the feed shaft during the drilling of one acre, $b$ is the number of times the trip counter must be tripped to indicate the coverage of one acre, and $n$ is any integer from 1 to 3 in the preferred embodiment illustrated so long as the total number of teeth is equal to or greater than the established minimum. However, it should be noted that for reasons of economy it is desirable to use the lowest integer $n$ consistent with the established minimum. In the foregoing example the tripping gear is disposed as shown in FIG. 2 and the tripping lever 76 is engaged and forced upwardly by the roll pin 74 during each revolution of the drive gear shaft causing the trip counter to indicate that one-tenth of an acre has been covered. Here an integer of one has been employed since the gear will have more than the established minimum number of teeth when the counter is tripped only one time for each revolution of the feed shaft. If the feed shaft revolves only 100 times during the drilling of an acre it will be necessary to employ a drive gear having either 20 or 30 teeth. If a drive gear is employed having 20 teeth the drive gear shaft will rotate only 5 times during the drilling of one acre. Therefore it will be necessary to operate the tripping lever two times for each revolution and the trip wheel 60 will be reversed so that the lugs 70, 72 each engage the lever once during each revolution. Here, in accordance with the preceding formula, $n$ will equal 2. It should be noted that the number of trips per revolution of the feed shaft is selected to equal $n$. Therefore, from the last example above it can be seen that if a drive gear having 30 teeth is employed the drive gear shaft will then rotate only three and one-third times during the drilling of one acre and then it will be necessary to operate the tripping lever three times for each revolution of the drive gear shaft. To accomplish this the roll pin 74 is so disposed that it projects outwardly on the same side of the tripping gear 60 as do the lugs 70, 72. Therefore the tripping lever will be operated during one revolution by the abutments 70, 72 and by the roll pin 74.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim therefore and desire to secure by Letters Patent is:

1. In combination with a grain drill of the type having a rotary feed shaft in which the total number of revolutions of the feed shaft may vary during the drilling of one acre, and a screw worm mounted on said feed shaft; a land measurer including a trip counter, a rotatable shaft, a gear mounted upon one portion of said rotatable shaft and engageable with said screw worm, said gear having a number of teeth equal to $$\frac{a}{b} \times n$$

where $a$ is the total number of revolutions of the feed shaft during the drilling of one acre, $b$ is the number of times the counter must be actuated to indicate coverage of one acre, and $n$ is any integer, and a counter tripping device mounted on another portion of said rotatable shaft and having a plurality of tripping means selectively positionable to trip said counter $n$ times during each complete revolution of said rotatable shaft.

2. A land measurer adapted for use with grain drilling means, said grain drilling means having rotary means which may revolve a different number of revolutions during the drilling of one acre, and land measurer driving means mounted on said rotary means, said land measurer comprising a trip counter, a rotatable shaft, a gear mounted upon a portion of said rotatable shaft and engageable with said land measurer driving means, said gear having a number of teeth equal to $$\frac{a}{b} \times n$$

where $a$ is the total number of revolutions of the rotary means during the drilling of one acre, $b$ is the total number of times the counter must be actuated to indicate the coverage of one acre, and $n$ is any integer, a trip wheel mounted upon another portion of said rotatable shaft, said trip wheel having a radially extending portion, a plurality of abutting surfaces adapted to be disposed to the sides of said radially extending portion, lever means disposable to one side of the radially extending portion and adapted to be pivotally moved by engagement with at least one of said abutting surfaces to trip said counter in response to said pivotal movement, said trip wheel and said slidably disposed abutting surface being so disposed relative to the lever means that said lever means will be engaged $n$ times by said abutting surfaces during each revolution of the rotatable shaft.

3. A land measurer adapted for use with grain drilling means, said grain drilling means having rotary means which may revolve a different number of revolutions during the drilling of one acre, and land measurer driving means mounted on said rotary means, said land measurer comprising a trip counter, a rotatable shaft, a gear mounted upon a portion of said rotatable shaft and engageable with said land measurer driving means, said gear having a number of teeth equal to $$\frac{a}{b} \times n$$

where $a$ is the total number of revolutions of the rotary means during the drilling of one acre, $b$ is the total number of times the counter must be actuated to indicate the coverage of one acre, and $n$ is any integer from 1 to 3, a trip wheel mounted on another portion of said rotatable shaft, said trip wheel having a radially extending portion, abutting means projecting sidewardly from said radially extending portion and including two abutting surfaces cast on one side surface of the radially extending portion and a slidably disposed abutting surface in said radially extending portion and slidable to either side of the radially extending portion, lever means disposable to one side of the radially extending portion and adapted to be pivotally moved by engagement with at least one of said abutting surfaces to trip said counter in response to said pivotal movement, said trip wheel and said slidably disposed abutting surface being so disposed relative to the lever means that said lever means will be engaged $n$ times by said abutting surfaces during each revolution of the rotatable shaft.

4. A land measurer including a rotatable shaft, a gear mounted upon a portion of said rotatable shaft, a trip wheel mounted upon another portion of said rotatable shaft, said trip wheel being provided with a plurality of sidewardly disposed abutting surfaces, at least one of said surfaces being a slidable pin, a counter, and movable means adapted to be movably engaged by said abutments during rotation of the rotatable shaft and to trip said counter in response to said movement.

5. A land measurer including a rotatable shaft, a gear mounted upon a portion of said rotatable shaft, a trip wheel mounted upon another portion of said rotatable shaft, said trip wheel having a radially extending portion, a plurality of abutting surfaces adapted to be disposed to the sides of said radially extending portion, at least one of said surfaces being a slidable pin, a counter, and lever means adapted to be pivotally moved by engagement with at least one of said abutments during each rotation of the shaft and to trip said counter in response to said pivotal movement.

6. The invention set forth in claim 5 in which two of the abutting surfaces are ribs cast on one side of the radially extending portion, and a third abutting surface is a roll pin which may be projected to either side of the radially extending surface.

7. In an apparatus of the class described, a trip wheel comprising a hub, a centrally disposed radially extending portion, two ribs cast on one side of the radially extending portion, a roll pin disposed within said radially extending portion and which may be disposed to either side of the radially extending portion, and radially extending grooves formed on the outer ends of the hubs.

References Cited in the file of this patent
UNITED STATES PATENTS

| | | |
|---|---|---|
| 222,834 | Moffitt | Dec. 23, 1879 |
| 2,524,385 | Hyland et al. | Oct. 3, 1950 |
| 3,011,704 | Durst | Dec. 5, 1961 |